(12) United States Patent
Sturm

(10) Patent No.: US 10,754,227 B2
(45) Date of Patent: Aug. 25, 2020

(54) COVER FOR A CAMERA BODY AND LENS

(71) Applicant: Think Tank Photo, Inc., Santa Rosa, CA (US)

(72) Inventor: Michael Allen Sturm, Redding, CA (US)

(73) Assignee: Think Tank Photo, Inc., Santa Rosa, CA (US)

( * ) Notice: Subject to any disclaimer, the term of this patent is extended or adjusted under 35 U.S.C. 154(b) by 0 days.

(21) Appl. No.: 16/431,599

(22) Filed: Jun. 4, 2019

(65) Prior Publication Data

US 2019/0377247 A1  Dec. 12, 2019

Related U.S. Application Data

(60) Provisional application No. 62/681,551, filed on Jun. 6, 2018.

(51) Int. Cl.
*G03B 17/56* (2006.01)
*G03B 17/08* (2006.01)

(52) U.S. Cl.
CPC .............. *G03B 17/56* (2013.01); *G03B 17/08* (2013.01)

(58) Field of Classification Search
CPC ............................. G03B 17/568; A45C 11/38
See application file for complete search history.

(56) References Cited

U.S. PATENT DOCUMENTS

| | | | | |
|---|---|---|---|---|
| 8,260,128 B1* | 9/2012 | Sturm | ................... | G03B 17/08 396/27 |
| 8,457,481 B2* | 6/2013 | Miglioli | ................. | A45C 11/38 396/27 |
| 8,781,312 B1* | 7/2014 | deSouza, Jr. | ........... | A45C 11/38 396/27 |
| 9,367,220 B2* | 6/2016 | Izaki | .................... | G06F 3/04845 |
| 2015/0257343 A1* | 9/2015 | De Lima | ............ | A01G 13/0281 47/31.1 |
| 2016/0018718 A1* | 1/2016 | Jones | ..................... | A45C 11/38 396/448 |

FOREIGN PATENT DOCUMENTS

| | | | | |
|---|---|---|---|---|
| CN | 2763855 Y | * | 3/2006 | |
| CN | 201097077 Y | * | 8/2008 | |
| DE | 20310735 U1 | * | 10/2003 | ........... H04N 5/2252 |
| JP | 2003051974 A | * | 2/2003 | |
| JP | 3146053 U | * | 10/2008 | |
| JP | 2014092684 A | * | 5/2014 | |

OTHER PUBLICATIONS

Vortex Media Storm Jacket camera cover product page (https://www.vortexmediastore.com/pages/storm-jacket-sizing-and-product-information Archive.org copy dated Jul. 4, 2017). (Year: 2017).*

* cited by examiner

*Primary Examiner* — Clayton E. LaBalle
*Assistant Examiner* — Leon W Rhodes, Jr.
(74) *Attorney, Agent, or Firm* — R. Dabney Eastham

(57) ABSTRACT

A cover for a camera body having a hot shoe and an attached lens has a flexible sleeve that has an opening for the end of the lens and an opening through which the camera body and lens can be inserted and through which the camera body can be manipulated. The sleeve is provided with a clear panel or window for viewing the camera body. The cover has a connector attached to the sleeve and protruding inwardly for detachable connection to the hot shoe of the camera body.

8 Claims, 4 Drawing Sheets

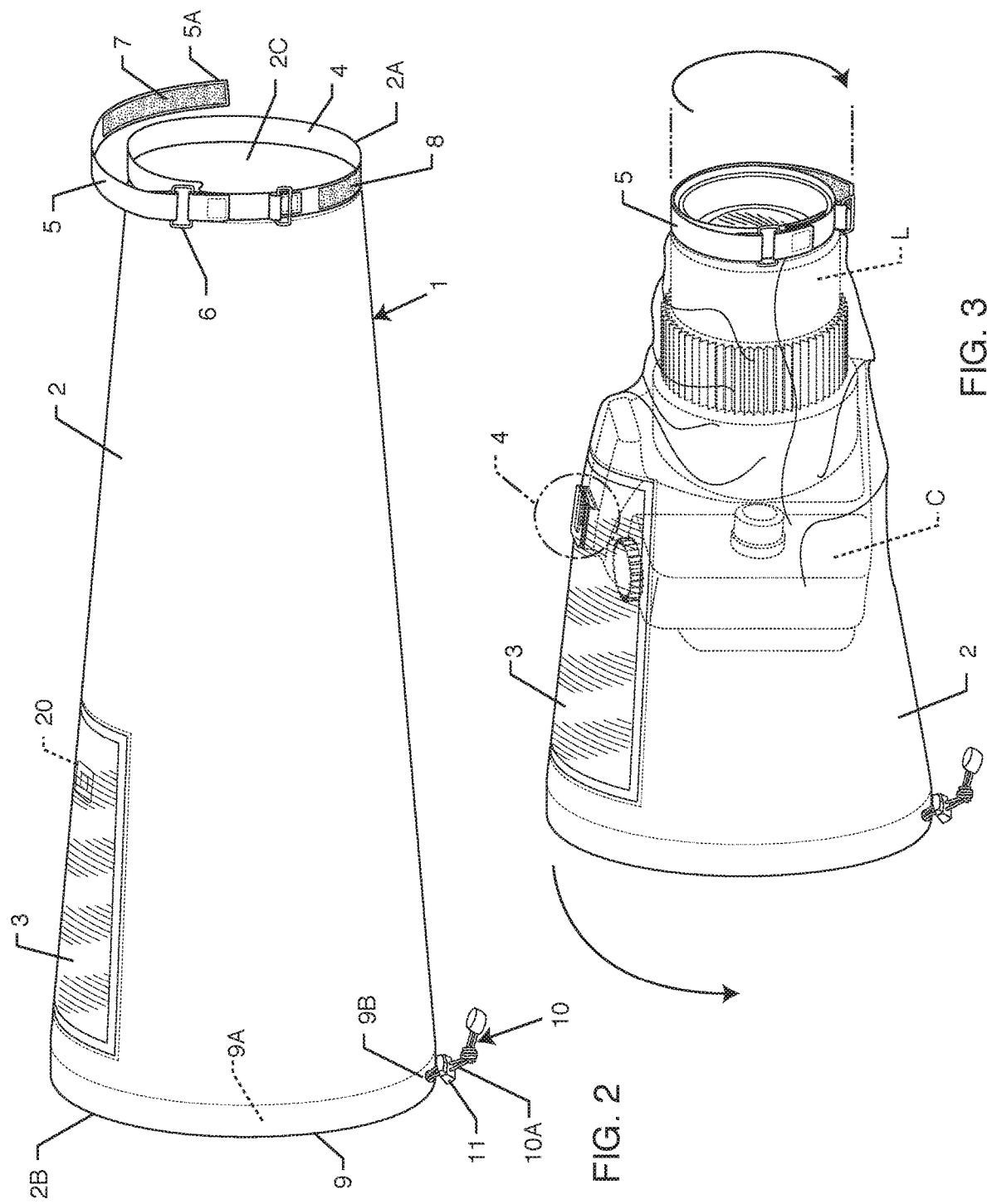

COVER FOR A CAMERA BODY AND LENS

CROSS-REFERENCE TO RELATED APPLICATIONS

This non-provisional application claims benefit and priority under 35 U.S.C. § 119(e) of U.S. provisional patent application Ser. No. 62/681,551, filed on Jun. 6, 2018 and titled "COVER FOR A CAMERA BODY AND LENS," the contents of which are incorporated by reference for all purposes.

TECHNICAL FIELD

The field of the invention is that of covers for cameras and particularly covers intended to protect camera bodies and lenses from moisture.

BACKGROUND ART

Many models of camera, particularly high quality cameras, have lenses separable from the bodies of the cameras. Modern single lens reflex and digital single lens mirrorless cameras are of this sort of camera and can mount lenses of various types, such as telephoto and wide-angle lenses.

Photographers may want to take photographs outdoors or in other places in which moisture, such as rain and dew, is precipitating. Alternatively, the location might be dusty. Moisture or dust may adversely affect electronic machinery and optical systems. Accordingly, a photographer's single lens reflex or digital single lens mirrorless camera body and lens will need protection from moisture or dust if the camera body and lens cannot be sheltered under a roof or an umbrella or otherwise.

Protective covers made of waterproof fabric are available for protecting camera bodies and lenses from moisture and dust. For example, the applicant, Think Tank Photo, Inc., designs and sells the Hydrophobia® series of protective rain covers. The Hydrophobia® 70-200 rain cover, for example, is designed to protect a single lens reflex camera with an attached 70-200 mm zoom lens. It is made of waterproofed fabric and is seam-sealed. It has sleeves with openings that may be secured about each of the photographer's hands as well as an opening for the light-gathering end of the lens. A clear window in the rear of the cover allows the photographer to see the camera's LCD display and a detachable eyepiece may be provided for accessing the viewfinder of the camera while preventing entry of dust or moisture through the Hydrophobia® protective rain cover. An internal strap secures the lens to the cover at the juncture of the lens with the camera body. A fabric lens cover is provided for covering the opening for the lens when the camera is not taking pictures.

Covers such as the Hydrophobia® 70-200 rain cover provide excellent protection for single lens reflex and digital single lens mirrorless camera bodies and their associated lenses. These covers have many features that appeal to the professional photographer. However, a simpler and lighter protective cover that may be deployed quickly would be of value to photographers. Such a cover preferably should be inexpensive and easily carried when not protecting the camera body and lens.

SUMMARY OF INVENTION

The invention provides a cover comprising a sleeve defining a compartment that is shaped to contain a camera body having a hot shoe and a lens attached to the camera body. The sleeve is made of a flexible material selected to protect the camera body and the lens from moisture and dust when the sleeve is deployed over the camera body and lens. The sleeve has a first end that has an opening communicating with the compartment and is sized to fit over the light-gathering end of the lens. The sleeve has a second end with an opening communicating with the compartment through which the camera body and lens may pass and that allows a photographer to insert his or her hands in order to hold the camera body and operate the controls on the camera body.

The sleeve further comprises a transparent portion or window so positioned on the sleeve that the transparent portion or window is adjacent the back and preferably the top of the camera body when the camera body and the lens are contained in the compartment defined by the sleeve. A connector attached to the sleeve and extending into the compartment is positioned to fit into the hot shoe of the camera body to detachably secure the camera body to the sleeve and position the camera body with respect to the sleeve so that the back and preferably the top of the camera body are visible to the photographer through the transparent portion or window. The cover may be folded or stuffed into a container or pouch when the cover is not deployed to protect a camera body and lens.

BRIEF DESCRIPTION OF DRAWINGS

Other objects, features, and advantages of the present invention will become more fully apparent from the following detailed description of preferred embodiments, the appended claims, and the accompanying drawings in which:

FIG. 2 is a right perspective view of the cover of FIG. 1;

FIG. 3 is a right perspective view of the cover of FIG. 1 having been pulled over a camera body having a hot shoe and a lens;

DESCRIPTION OF EMBODIMENT

Figure 1:
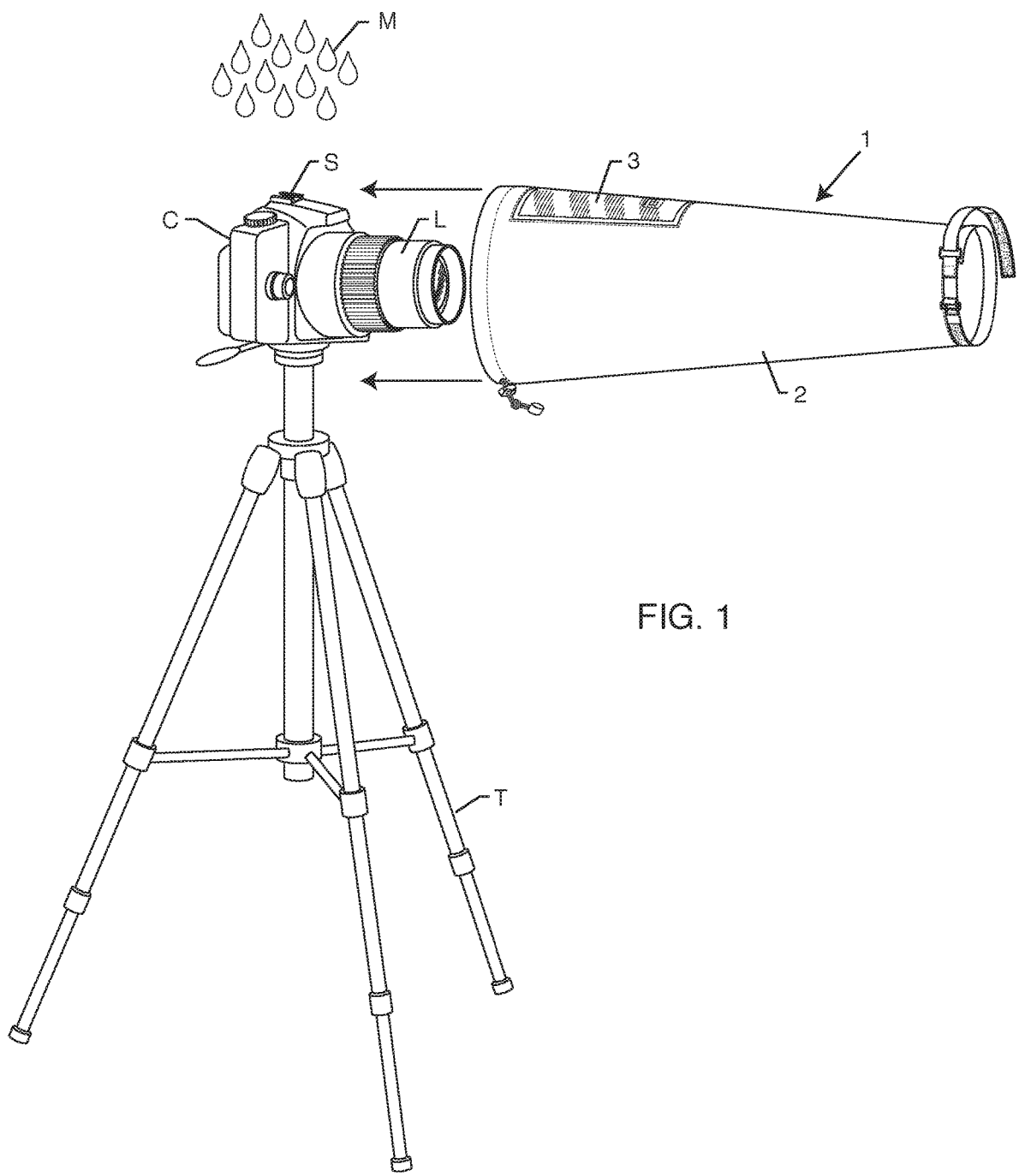
FIG. 1 is a right front perspective view of an embodiment of a cover for a camera body and lens according to the invention that is shown about to be applied to a camera body having a hot shoe and a lens mounted on a tripod, wherein "right" is from the point of view of a photographer using the camera body and lens.

FIG. 1 shows a preferred embodiment of a cover 1 according to the present invention for application to a camera body and lens. FIG. 1 shows the cover being inserted over a camera body C and lens L. The camera body C shown in FIG. 1 may be a digital single lens reflex camera body, a digital single lens mirrorless camera body, or even a single lens reflex camera body using film. The lens L is mounted on the front of the camera body C. The camera body C has a hot shoe S mounted on its top. The hot shoe S is a socket on the camera body C with direct electrical contacts for an attached flashgun or other accessory. The camera body C is shown mounted on a tripod T. FIG. 1 shows the camera body C and the lens L to be threatened by the descent of the moisture M, which is to be countered by the cover C.

FIG. 2 shows the cover 1 by itself, prior to its being applied to protect the camera body C and the lens L. The cover 1 has a sleeve 2 formed from a water-resistant, and preferably waterproof, flexible material, such as coated nylon or polypropylene fabric, that preferably has a light weight. The sleeve 2 is generally tubular and has a first end 2A and a second end 2B. The first end 2A defines the opening 4 and the second end 2B defines the opening 9. The opening 9 is shown to be larger (has a greater diameter) than the opening 4 and as a result the sleeve 2 narrows from the second end 2B to the first end 2A. This gives the sleeve 2 the general overall shape of a right conical frustum or a truncated right circular cone when the sleeve 2 is extended lengthwise and radially.

The sleeve 2 defines an interior space or compartment 2C when the sleeve 2 is dilated as shown in FIG. 2. The sleeve 2 may be flattened so that the cover 1 may be folded or rolled up for convenient storage when the cover 1 is not to be used, in which case the compartment 2C disappears.

Some lenses, such as the Sigma® 200-500 f/2.8, have a light-gathering end that has a diameter larger than the widest or highest dimensions of a normal camera body. The sleeve 2 then might have to have an opening 4 that is larger than the opening 9, in which case the sleeve 2 will have the shape of an inverted right conical frustum (wider circular base to the front). It will be understood that the shape and size of the sleeve 2 may have to be adjusted to accommodate lenses of unusual dimensions. The sleeve 2 may have a different shape than that of a right conical frustum when deployed, such as an oblique conical frustum or an irregular version of either of these shapes.

For the mass market a range of sleeves with dimensions to fit the most commonly used lenses may be made available. Because of the flexibility of the material of the sleeve 2, a single cover 1 could be provided that will accommodate a range of commonly used lenses and camera bodies as long as the sleeve 2 is provided with sufficient length as well as diameters at the openings 4 and 9. The openings 4 and 9 can be contracted or made smaller after the camera body C and the lens L are inside the interior space 2C of the sleeve 2 to protect smaller lenses and camera bodies.

The sleeve 2, being made of a flexible material, may be collapsed and folded or stuffed into a pouch (not shown) or other container for storage when the camera body C and the lens L do not need to be protected from moisture or dust, but ready for use when the weather conditions are bad enough to require protection from moisture or dust. The pouch with the cover 1 inside it could be stored in the compartment of a camera bag or attached to a camera bag, the camera body C, or another piece of the photographer's equipment by a small snap-link or karabiner. Alternatively, the photographer may just stuff the cover 1 into a compartment of a camera bag, backpack, or other piece of the photographer's equipment or into a pocket in the photographer's clothing.

The opening 4 in the end 2A has a diameter chosen to fit over the front or light-gathering end of the lens L. The end 2A is secured over the front end of the lens L by a strap 5 attached to the end 2A by a buckle or D-ring 6 whereby the strap 5 is disposed circumferentially around the end 2A. A free end 5A of the strap 5 can be tensioned away from the buckle or D-ring 6 and secured to the end 2A by the mating hook and loops strips 7 and 8 sewn to the free end 5A of the strap 5 and to the end 2A of the sleeve 2, respectively. This will contract the end 2A around the front end of the lens, as shown in FIG. 3.

Figure 8:
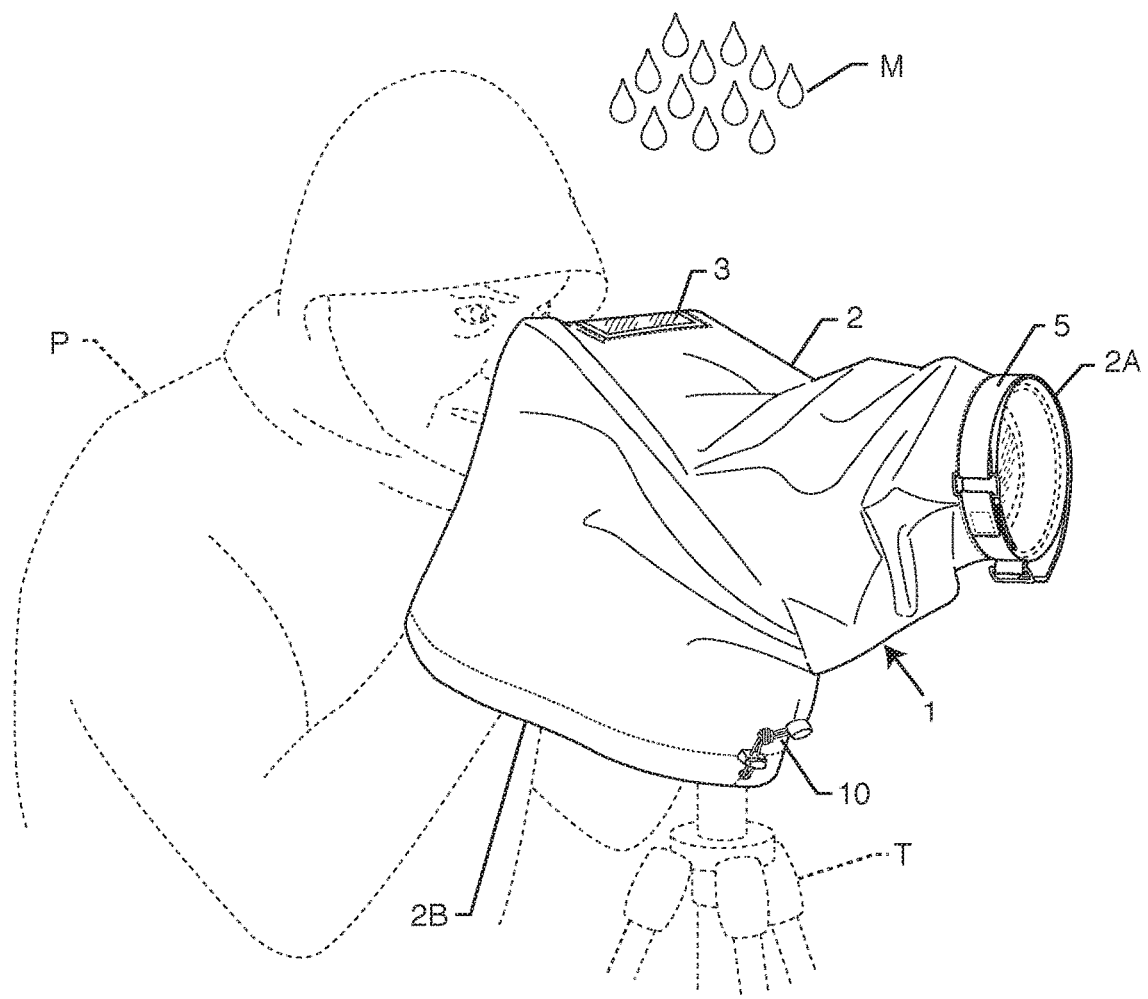
FIG. 8 is a right perspective view of the cover of FIG. 1 shown fully deployed over a camera body and lens mounted on a tripod with a photographer shown in dotted line using the camera.

The end 2B of the cover 1 has a diameter chosen to allow a photographer access to the camera C as illustrated in FIG. 8. A cord 10 passes through a tunnel 9A formed in the end 2B of the cover 1, around the opening 9, by inverting a portion of the end 2B and sewing it to the sleeve 2. The cord 10 encircles the opening 9 and then passes to the exterior of the sleeve 2 through a hole 9B formed in the sleeve 2. An end 10A of the cord 10 may be drawn through the hole 9B in order to contract the opening 9 as desired. A spring-loaded toggle 11 is provided through which the cord 10 is passed. The toggle 11, when released, will lock the cord 10 to prevent the end 10A from retreating through the hole 9B into the tunnel 9A and thereby maintain constriction of the opening 9. Squeezing the toggle 11 will allow the cord 10 to slide through the toggle 11 and the hole 9B to thereby relax the constriction of the opening 9. The cord 10 may be made of elastic material in order to better secure the constriction of the opening 9 by providing a biasing tension when the end 10A of the cord 10 is pulled through the toggle 11.

Figure 9:
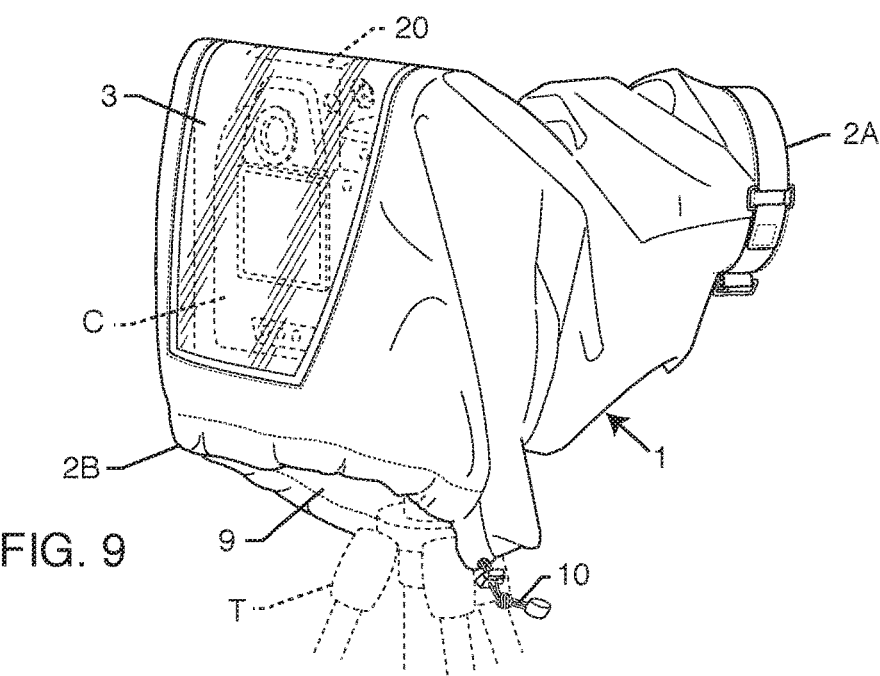
FIG. 9 is right rear perspective view of the cover of FIG. 8 shown fully deployed over a camera body band lens.

The sleeve 2 comprises a transparent portion or window 3 that permits a photographer to view the screen and controls of the camera body C, as shown in FIG. 9. The window 3 is positioned so that it drapes over the back side and preferably the top side of the camera body C when the cover 1 is positioned over the camera body C and the lens L as shown in FIGS. 3 and 9.

The window 3 may be made of a panel of flexible and generally transparent material such as polyurethane. The panel of the window 3 covers of fills an opening formed in the sleeve 2. The window 3 may be attached to the rest of the sleeve 2 by sewing or welding. The connection of the window 3 to the remainder of the sleeve 2 preferably is waterproof.

The sleeve 2 has a connector 20 fastened inside the camera sleeve 2 at a location where the sleeve 2 will contact the hot shoe S when the cover 1 is in position over the camera body C and the lens L. Preferably the window 3 will extend over the hot shoe S so the photographer may view the controls at the top side of the camera body C. The connector 20 then will be attached to the interior side of the window 3 so the connector 20 will extend into the interior 2C of the sleeve 2. The connector 20 preferably is made of a plastic material such as polypropylene and is either molded or milled. The connector 20 may be attached to the interior side of the window 3 by adhesives or by sewing. A waterproof attachment is preferred. If sewn, a system of connection such as the liquid-resistant connector at disclosed in applicant's U.S. Pat. No. 8,260,128 B1 will provide a waterproof attachment. (The disclosure of U.S. patent U.S. Pat. No. 8,260,128 B1 is incorporated by reference into this specification.)

Figure 4:
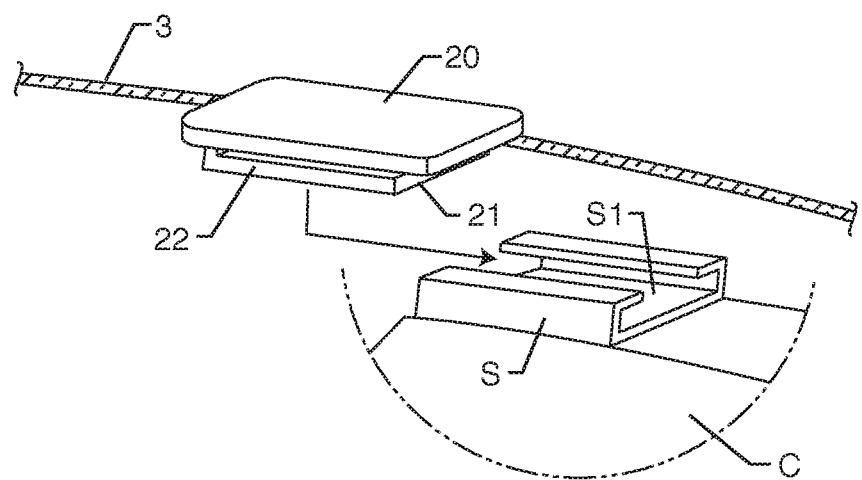
FIG. 4 is an expanded view of a portion of the cover of FIG. 3 indicated by the phantom line circle in FIG. 3, showing how the cover is attached to the hot shoe of the camera body.
Figure 5:
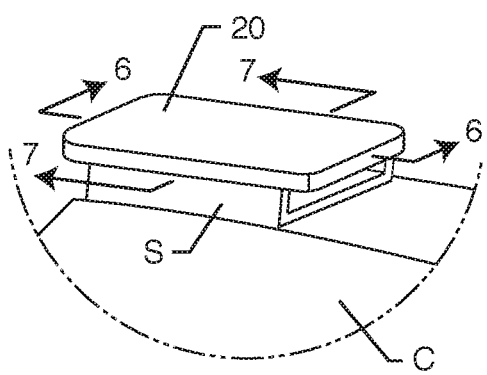
FIG. 5 is an expanded view of a portion of the cover of FIG. 3 as shown in FIG. 4, showing the cover attached to the hot shoe of the camera body.
Figure 6:
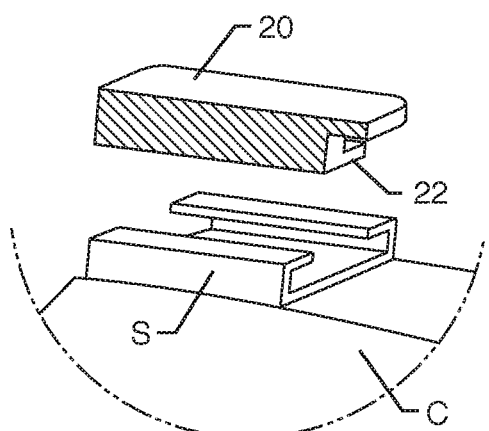
FIG. 6 is an expanded sectional view of a portion of the cover of FIG. 3 as shown in FIG. 5 to the hot shoe of the camera body as indicated by the sectional plane 6-6 in FIG. 5.
Figure 7:
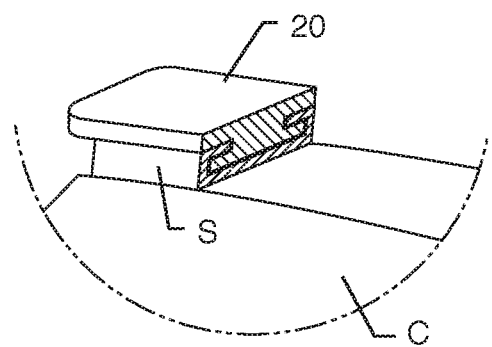
FIG. 7 is a sectional view of the attachment of a portion of the cover of FIG. 3 to the hot shoe of the camera body as indicated by the sectional plane 7-7 in FIG. 5.

FIG. 4 shows how the connector 20 is inserted into the hot shoe S. The connector 20 is slid into the hot shoe S to the position shown in FIG. 5. The hot shoe S defines a slot S1 that has a roughly C-shaped cross-section that is open above. The connector 20 has an extension 21 with flanges 22 on either side that will fit into the slot S1 as shown in FIG. 5 and in the sectional views 6 and 7. The attachment of the connector 20 to the hot shoe S will maintain the position of the window 3 with respect to the camera body C.

FIGS. 8 and 9 show the cover 1 emplaced over the camera body C and the lens L. The sleeve 2 of the cover 1 has been slid over the camera body C and the lens L so the end 2B is below the camera body C. The connector 20 is inserted into the hot shoe S of the camera body C. The opening 9 opens downwardly so the moisture M will not reach the camera body C and the lens L. The opening 4 in the end 2A of the sleeve 2 is secured around the front of the lens L by contracting the strap 5. The moisture M will not be able to access the interior 2C of the sleeve 2. The cover 1 thus protects the camera body C and the lens L from the moisture M (or from dust).

FIG. 9 shows how the photographer P may view the back side and the top side of the camera C through the window 3. FIG. 8 shows how the photographer may insert his or her hands through the opening 9 in the cover 1 in order to hold the camera C and operate the controls of the camera C (such as the shutter) and the lens L (such as a manual focus).

The invention is intended to cover alternatives, modifications and equivalents that may be included within the spirit and scope of the invention as defined by the appended claims. For example, other materials than those mentioned above but having similar properties may be employed.

What is claimed is:

1. A cover for a camera body having a hot shoe mounted on a top of the camera body and a lens attached to the camera body, comprising:
    a sleeve made of flexible waterproof material having first and second ends and defining a compartment having an opening at each of the first and second ends, wherein the camera body and the lens may be contained within the compartment of the sleeve, the opening of the first end is sized to fit around a light-gathering end of the lens, and the opening of the second end will permit the passage of the camera body and lens into the compartment,
    a window comprising a portion of the sleeve, the window being generally transparent;
    a connector attached to the window and extending from an inner side of the window into the compartment, the connector having a portion formed so as to be insertable into the hot shoe in order to connect the sleeve to the camera body, the connector being positioned with respect to the sleeve so when the camera body and the lens are placed within the sleeve and the connector is attached to the hot shoe of the camera body the window will be disposed over at least a back side and a top side of the camera body;
    whereby a photographer may view the back side and the top side of the camera body through the window of the sleeve when the camera body and the lens are placed within the compartment of the sleeve and the photographer may pass his or her hands through the opening of the second end in order to hold the camera and manipulate controls on the camera body.

2. The cover according to claim 1 wherein the connector is formed with rails for engaging the hot shoe.

3. The cover according to claim 1 further comprising a strap attached to the first end for contracting the opening of the first end around the light-gathering end of the lens.

4. The cover according to claim 3 wherein the strap is circumferentially disposed around the first end and the strap has a free end provided with a hook or loop strip and the first end has a corresponding loop or hook strip disposed on the first end to engage the hook or loop strip on the free end of the strap whereby the strap may be tensioned to contract the opening in the first end.

5. The cover according to claim 1 wherein the second end forms a tunnel disposed circumferentially around the opening in the second end and further comprising a cord disposed within the tunnel and extending from the tunnel through a hole formed in the sleeve whereby an end of the cord may be withdrawn from the tunnel to contract the opening in the second end.

6. The cover according to claim 5 wherein the end of the cord is provided with a toggle lock for locking the cord.

7. A method of protecting a camera body having a hot shoe mounted on a top of the camera body and a lens attached to the camera body, comprising:
    providing a cover comprising a sleeve made of flexible waterproof material having first and second ends and defining a compartment having an opening at each of the first and second ends, wherein the camera body and the lens may be contained within the compartment of the sleeve, the opening of the first end is sized to fit around a light-gathering end of the lens, and the opening of the second end will permit the passage of the camera body and lens into the compartment, a window comprising a portion of the sleeve, the window being generally transparent; a connector attached to the window and extending from an inner side of the window into the compartment, the connector having a portion formed so as to be insertable into a hot shoe mounted on a top of the camera body in order to connect the sleeve to the camera body, the connector being positioned with respect to the sleeve so when the camera body and the lens are placed within the sleeve and the connector is attached to the hot shoe of the camera body the window will be disposed over a back side and a top side of the camera body;
    inserting the camera body and lens through the opening of the second end of the sleeve into the compartment;
    securing the first end of the sleeve around the light-gathering end of the lens;
    attaching the connector to the hot shoe of the camera body; and
    folding the sleeve over the camera body so that the window is positioned over the back side and the top side of the camera body.

8. The method according to claim 7 further comprising inserting the hands of a photographer through the opening in the second end of the sleeve in order to hold the camera body and lens and manipulate controls on the camera body and lens.

* * * * *